(12) United States Patent
Shoberg

(10) Patent No.: US 6,782,594 B2
(45) Date of Patent: Aug. 31, 2004

(54) METHOD AND APPARATUS FOR AUDITING A TENSION LOAD IN THE THREADED FASTENER

(76) Inventor: Ralph S. Shoberg, 25286 Witherspoon, Farmington Hills, MI (US) 48335

(*) Notice: Subject to any disclaimer, the term of this patent is extended or adjusted under 35 U.S.C. 154(b) by 0 days.

(21) Appl. No.: 09/825,416

(22) Filed: Apr. 3, 2001

(65) Prior Publication Data

US 2001/0037550 A1 Nov. 8, 2001

Related U.S. Application Data

(62) Division of application No. 09/222,765, filed on Dec. 29, 1998, now abandoned.
(60) Provisional application No. 60/070,051, filed on Dec. 30, 1997.

(51) Int. Cl.[7] .............................................. B23Q 17/00
(52) U.S. Cl. .......................... 29/407.03; 29/407.02; 29/702; 173/5; 173/176; 173/181; 173/183; 73/1.09
(58) Field of Search .................... 29/407.02, 407.03, 29/701, 702, 714; 173/5, 6, 176, 178, 180, 181, 183; 23/1.09, 1.11, 1.12

(56) References Cited

U.S. PATENT DOCUMENTS

| | | | |
|---|---|---|---|
| 3,962,910 A | * | 6/1976 | Spyridakis et al. |
| 3,974,883 A | * | 8/1976 | Sigmund |
| 4,006,629 A | | 2/1977 | Barrett et al. ................ 73/139 |
| 4,008,772 A | | 2/1977 | Boys .......................... 173/12 |
| 4,104,778 A | * | 8/1978 | Vliet |
| 4,106,176 A | | 8/1978 | Rice et al. .................... 29/407 |
| 4,179,786 A | | 12/1979 | Eshghy ........................ 39/407 |
| 4,244,213 A | | 1/1981 | Marcinkiewicz ............. 73/139 |
| 4,319,494 A | * | 3/1982 | Marcinkiewicz ......... 73/862.23 |
| 4,426,887 A | | 1/1984 | Reinholm et al. ........ 73/862.23 |
| 4,450,727 A | * | 5/1984 | Reinholm et al. ........ 73/862.23 |
| 4,715,211 A | | 12/1987 | Lehoczky ..................... 73/1 C |
| 4,768,388 A | * | 9/1988 | Fader et al. ............. 73/862.23 |
| 5,591,919 A | | 1/1997 | Hathaway et al. ............ 73/761 |
| 5,668,328 A | | 9/1997 | Steber et al. ............ 73/862.23 |
| 6,212,763 B1 | * | 4/2001 | Newman ..................... 29/702 |

OTHER PUBLICATIONS

Shoberg, Torque–Angle Signature Analysis Feb. 1996 issue of *Fastener Technology International* pp. 69–70.

* cited by examiner

*Primary Examiner*—David P. Bryant
*Assistant Examiner*—Eric Compton
(74) *Attorney, Agent, or Firm*—Young & Basile, P.C.

(57) ABSTRACT

The present invention is directed towards a method and an apparatus for accurately estimating the tension or clamp force in a bolted joint. An installed fastener is rotated and the torque necessary to rotate the fastener and the angle through which the fastener is rotated are measured. The angle and torque values are plotted against one another such that the angle values are plotted on an angle axis and the torque values are plotted on a torque axis. A tangent is extended from the plot towards the angle axis. The point at which the tangent crosses the angle axis is defined as zero degrees and is called the "elastic origin". The known angle through which the fastener rotates is used to scale the angle axis. The angle from the elastic origin to the point at which the tangent was drawn is defined as the M-alpha angle and is directly proportional to the clamp force created by the bolted joint or tension in the fastener.

8 Claims, 4 Drawing Sheets

METHOD AND APPARATUS FOR AUDITING A TENSION LOAD IN THE THREADED FASTENER

CROSS-REFERENCE TO CO-PENDING APPLICATION

This application is a divisional application of U.S. patent application Ser. No. 09/222,765, filed Dec. 29, 1998 abandoned, in the name of Ralph S. Shoeberg and entitled "Method and Apparatus for Auditing a Tension Load in the Threaded Fastener."

Applicants hereby claim the benefit of the priority date of U.S. Provisional Patent Application Serial No. 60/070,051 filed Dec. 30, 1997 in the name of Ralph S. Shoberg and entitled "METHOD AND APPARATUS FOR AUDITING A TENSION LOAD IN THE THREADED FASTENER," the contents of which are incorporated herein in their entirety by reference.

FIELD OF THE INVENTION

The present invention relates to a method and an apparatus for determining representative tension forces in an installed, threaded fastener.

BACKGROUND OF THE INVENTION

When using a threaded fastener to create a bolted joint to connect multiple components, the clamp load created by the bolted joint is critical. The clamp force created by the bolted joint is directly proportional to the tension in the bolt. One way of indirectly measuring or auditing the clamp force or tension is by measuring the torque value it takes to break the threaded fastener loose.

Typically, a torque reading is obtained with a bending beam or dial indicator-type torque wrench. While this technique is still used today for non-critical applications, the readings obtained are known to have little or no correlation with the actual tension developed by the installation torque. Other than the fact that, in general, higher values of breakaway torque indicate that higher installation torque may have been applied, the breakaway torque measurement cannot be relied upon to verify fastener tension.

However, torque readings are not always useful. This is because there are anywhere from 75 to over 200 factors that effect the tension in a bolt when a tightening torque is applied. The main variable that effects the amount of tension in a bolt is friction. Friction can be present underneath the bolt itself, so called under head friction or friction at the threads. A typical construction of a bolted fastener is illustrated in FIG. 1.

Problems associated with measuring torque in bolted assemblies is increased by power tools which are used to deliver torque to turn fasteners in a controlled fashion. Such power tools include impact wrenches and other pulse tools. Unfortunately, the limitations of these tools relate to their energy transfer characteristics which are not generally well understood. In this respect, the tightening results in terms of the torque/tension for achieved clamp force are very much dependent on the joint friction. Pulse and impact tools are particularly sensitive to joint rate and friction variations. Since friction coefficients are a function of velocity as well as surface pressure, tightening results with pulse and high RPM tools can lead to a wide range of actual clamp forces for a given torque value. Pulse and impact tools move faster at high speeds with a great deal of stick-slip, chatter and unique frictional characteristics that are not seen with steady continuous tightening. These factors can lead to a deceptively high torque reading but with minimal clamp force created.

In 1968, the first rotary socket wrench torque transducers and the first battery powered peak meters were introduced. This allowed a comparison of dynamically applied torque to hand torque audits. Thus, the techniques for measurement and interpretation of torque signatures became highly refined and capabilities were developed to interpret both tool torque control and other factors.

Since the desired result in a bolted joint is proper fastener tightness or tension, the ideal audit process would directly determine the tension of the fastener. This can be done by attaching strain gauge to the bolt or using a force washer. However, since it is not practical to put strain gauges on production assemblies or use force washers under the head of each bolt, other techniques had to be developed. Ultrasonic techniques for measuring bolt stretch have proven useful in some applications, but there are practical limitations for this method.

If the friction coefficients and other variables associated with a given bolted joint are uniform and repeatable, it is possible to demonstrate that fastener assemblies tightened to a specified torque will achieve relatively uniform clamp loads to provide reliable performance. However, friction variables are often non-uniform and cannot be repeated. Further, these sophisticated torque measurements do not provide an accurate measurement of clamp force after installation.

While threaded fastener design procedures in software are available to assist engineers in designing bolted joints, engineers have heretofore had no practical, accurate way of determining whether the installed fastener meets the preload/tension design requirements. Therefore, a need has arisen to develop a practical, cost effective technique whereby the tension in a threaded fastener can be more accurately determined, and a method of accurately determining the residual tension on a bolted connection after a period of use.

SUMMARY OF THE INVENTION

The present invention provides a method and apparatus for auditing a tension value in an installed threaded fastener. The method includes applying a torque to a threaded fastener until a torque is reached to rotate the fastener. The torque applied to the fastener is measured as well as the angle through which the fastener rotates. These values are plotted against one another such that the torque values are plotted on a torque axis and the angle values are plotted on an angle axis. A tangent is extended from the plot at a point where the fastener began rotating towards the angle axis. The point at which the tangent line crosses the angle axis is defined to be zero degrees and the angle axis is then scaled based upon the known angle of rotation. The angle from the zero degree point to the angle corresponding to the torque necessary to rotate the fastener is directly proportional to the tension or preload in the fastener.

The invention also provides for an apparatus to audit tension in a threaded fastener. The apparatus includes a wrench operative to engage the fastener, a torque transducer which generates a signal characteristic of the torque applied to the fastener and an angle transducer which generates a signal characteristic of the angle through which the fastener rotates in response to the applied torque. A processor receives the signals from the torque and angle transducers and is configured to locate the elastic origin for the threaded fastener and determine a M-alpha angle. The M-alpha angle is directly proportional to the tension in the fastener and the processor can compare it against the predetermined M-alpha angle to determine whether the audited fastener is developing adequate clamp force.

DESCRIPTION OF THE PREFERRED EMBODIMENT

Figure 1:
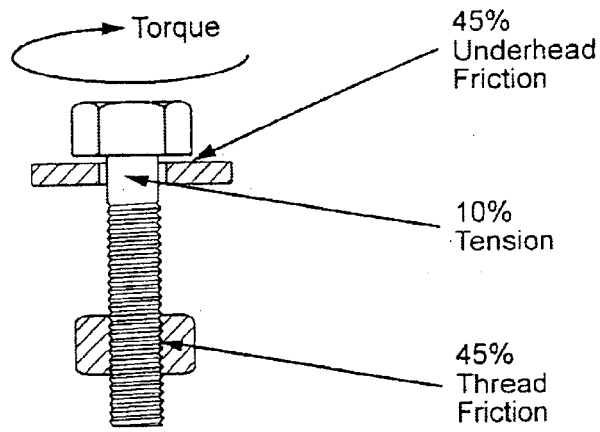
FIG. 1 is a schematic illustration of the typical construction of a bolted joint.
Figure 2:
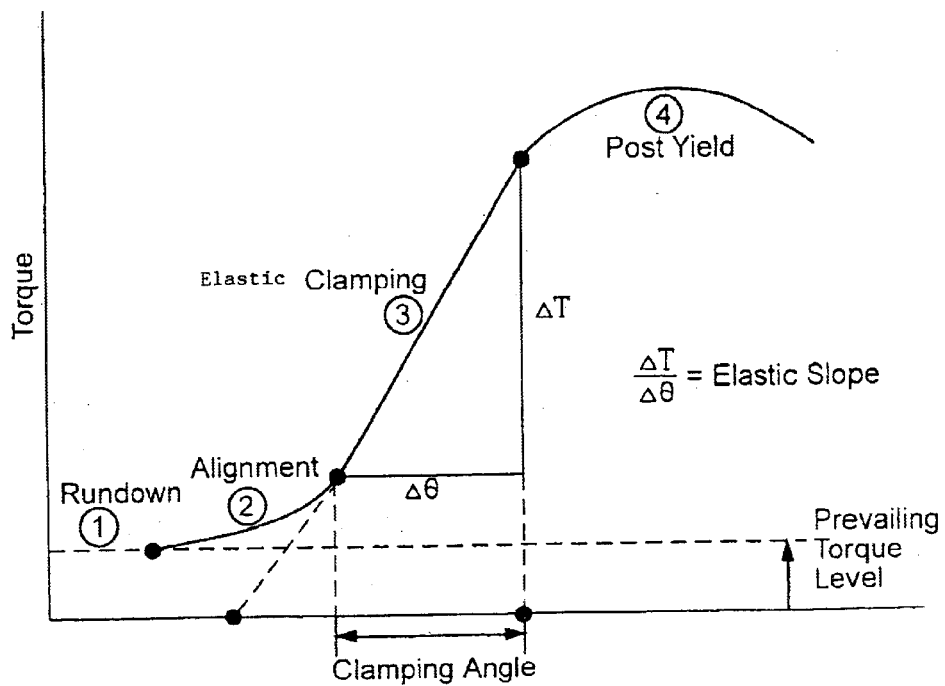
FIG. 2 is an example of a typical torque versus angle plot for tightening a threads fastener.

The process of tightening a fastener involves turning the lead screw and torque so that tension is produced in the fastener. The desired result is a clamping force to hold components together. A typical torque versus angle signature curve for a fastener in a tightening process has four distinct zones as illustrated in FIG. 2. The first zone is the rundown zone. The rundown zone is the prevailing torque zone before the fastener head or nut contacts the bearing surface. The second zone is the alignment or snugging zone where the fastener and joint mating surfaces are drawn into alignment. The third zone is the elastic clamping range, where the slope of the torque angle curve is essentially a constant. This is the zone where tension is created in the fastener. The fourth zone is the post yield zone which begins with an inflection point at the end of the elastic range. Occasionally, the fourth zone can be due to yielding in the joint or gasket, or due to yield of the threads in the nut or clamped components or nut rather than to yield of the fastener.

The basic elastic torque-tension equation is: $T = K \times D \times F$ to estimate the relative magnitudes of torque and clamp force. In this equation T=the torque, K=the nut factor, D=the nominal diameter, and F=the force. This equation defines a linear relationship between torque and tension.

The nut factor "K" is influenced by three factors: a geometric factor, a thread friction factor, and an under head friction factor. The friction factors are the dominant variables in determining the nut factor. Thus, to insure overall reliable performance of a bolted joint, it is necessary to control the frictional characteristics in both the thread and under head regions. Achieving a specific clamp force during installation is always the desired result. However, the role of thread and under head friction must not be overlooked in preventing loosening.

Extensive testing has proven that the tension produced by a bolted joint is directly proportional to the angle of turn from what I have defined as the elastic origin. The elastic origin is defined as the location of a projected tangent line from the elastic portion of the torque angle signature curve backward to zero torque. The total angle of turn from the elastic origin is directly proportional to the compression of the clamped components plus the stretch of the fastener, and thus, is directly proportional to clamp force.

Figure 3:
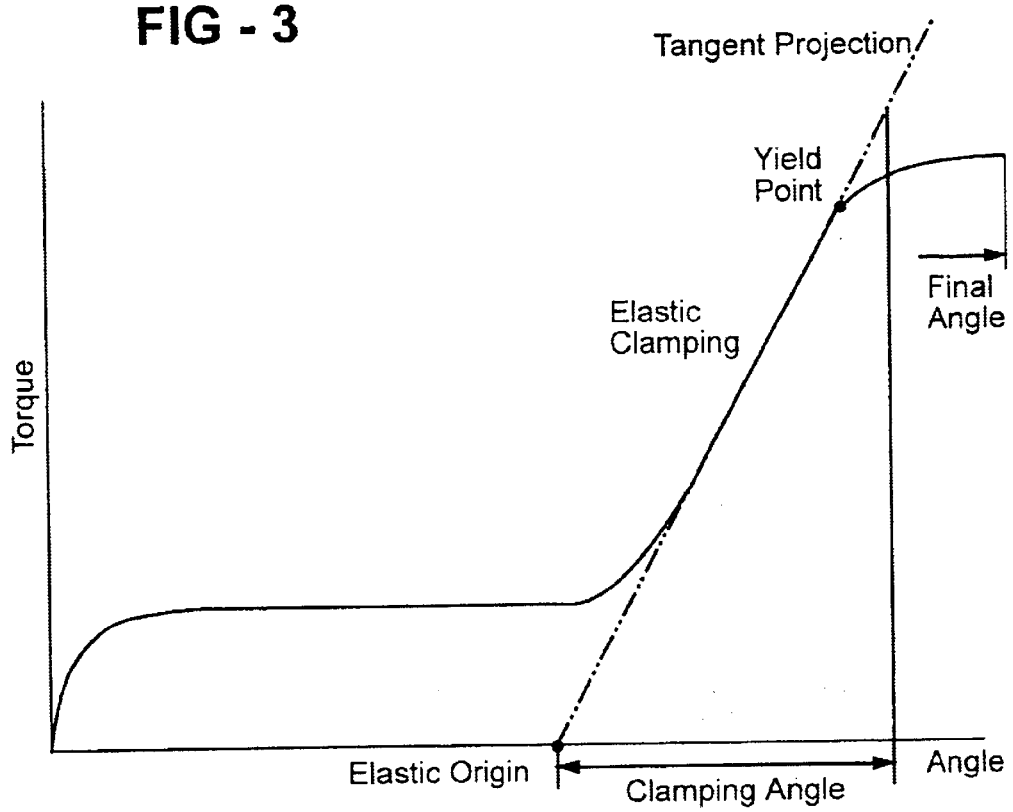
FIG. 3 is an example of how to calculate the elastic origin and M-alpha angle.

Once torquing has stopped in the elastic clamping zone, a line tangent to the straight line portion of the curve can be projected backwards. The point where the projection strikes zero torque, if there is no prevailing torque, is the elastic origin. If the angle of turn is measured from the elastic origin to the point where the torquing was stopped in the elastic clamping zone, it will be found that the tension in the fastener is directly proportional to that angle of turn. What I have discovered is that the compression of the parts and stretching of the fastener is occurring in a linear fashion from the projected elastic origin. I have defined the angle of turn as the clamping angle or the "M-alpha" angle. Calculation of the M-alpha angle is illustrated in FIG. 3.

I have discovered a method and apparatus to measure the M-alpha angle and get a direct indication of the actual tension in a threaded fastener. These findings as well as many applications of my findings are outlined in my article entitled "Engineering Fundamentals of Threaded Fastener Design and Analysis," a copy of which is attached hereto as Exhibit A and which is incorporated herein by reference.

An audit process can be done by using a torque wrench having a transducer which measures applied torque in combination with a transducer that measures the angle through which the fastener is rotated.

Figure 4:
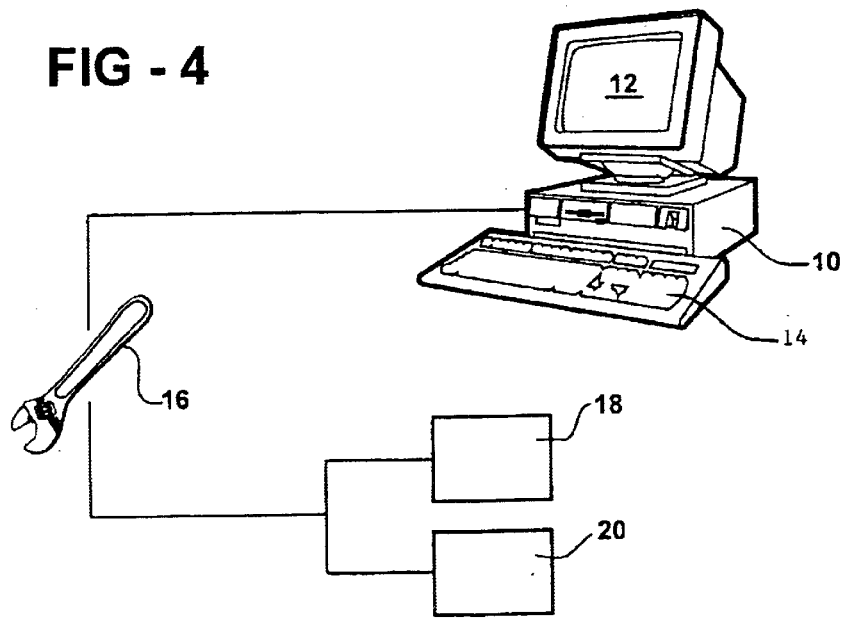
FIG. 4 is a schematic of an apparatus for auditing torque in a threaded fastener.

As shown in FIG. 4, the tools necessary to conduct a torque audit typically include a processor 10 having a computer screen 12 and keyboard 14 as well as a proper torque wrench 16 and torque transducer 18 and angle transducer 20. Processor 10 is configured to receive torque and angle measurements and calculate the M-alpha angle.

Specialized torque angle transducers are available to record the angle and torque applied to a bolted joint. One such transducer is available from RS Technologies Limited, 37428 Hills Tech Drive, Farmington Hills, Mich. 48331 as a model 960 transient recorder or a model 9404 or 9504 transient recorder. It is understood that other torque/angle transducer configurations are available. For example, the torque/angle transducers may be separate from or internal to the torque wrench. Also, a user may be able to measure torque and angle in less precise ways without the use of transducers.

An operator can apply torque to an installed fastener to break it free and rotate the fastener. In the preferred embodiment, the torque and angle transducers will record the applied torque and the angle through which the fastener turned. The information collected can be used to create a torque versus angle of turn plot. As illustrated in FIG. 3, a tangent may be extended from the linear portion of the plot adjacent the breakaway point back to a zero torque value (i.e. back to the angle axis). In some applications, this point may be after the peak release torque because the peak release torque may be artificially high as a result of static friction due to, for example, a lock washer or thread locking adhesive. The point at which the tangent crosses the angle axis is the elastic origin and is defined to be zero degrees. The known angle of turn measured by the angle transducer can be used to scale the angle axis from the elastic origin. Once the angle axis has been scaled, the M-alpha angle can be measured. It is understood that processor 10 may carry out these steps without actually drawing a torque versus angle plot. A person of ordinary skill would recognize that the concept of a torque versus angle plot is necessary only to illustrate what is being done to measure the M-alpha angle, and that processor 10 must use the concept of a plot to calculate the tangent, albeit without actually drawing the plot.

Prior art bolted design software packages may be modified to incorporate the elastic origin and M-alpha concepts.

Thus, an engineer in designing a bolted joint can determine the M-alpha angle for a given clamp load with a defined threaded fastener configuration. Engineers may then use the design determined M-alpha value to compare against an audited M-alpha value for an installed fastener to determine whether adequate tension has been developed.

Figure 5:
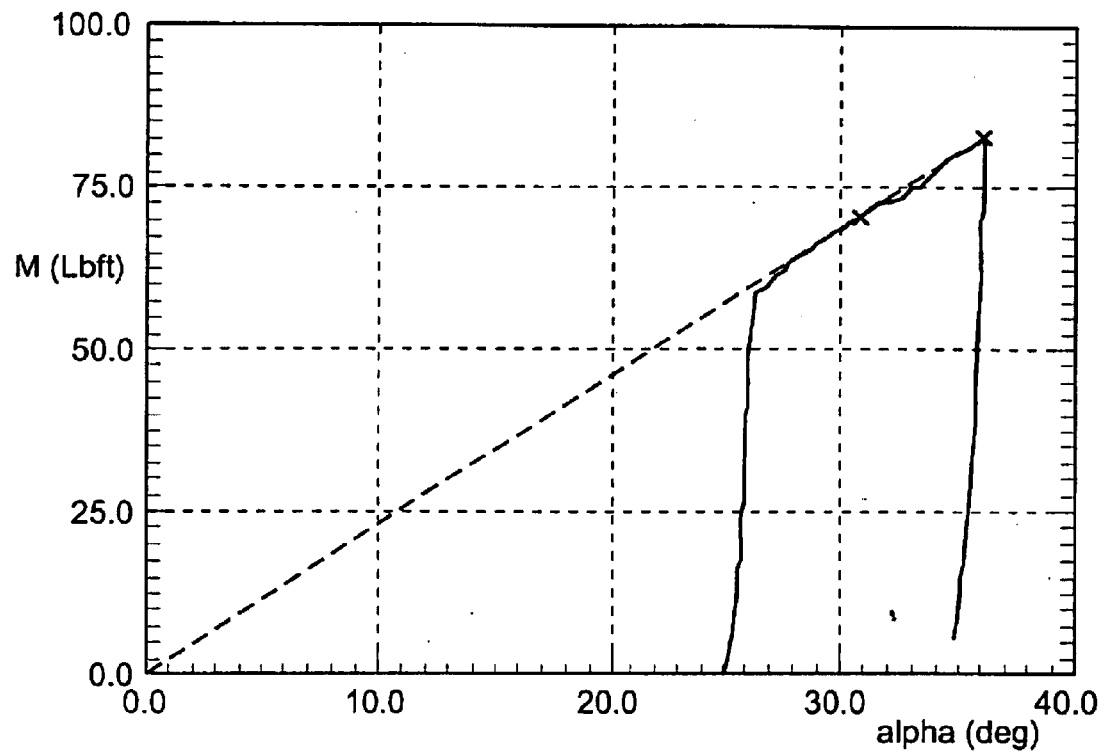
FIG. 5 is a graph depicting a first torque audit.

For example, assume that the design for a bolted joint requires an M-alpha angle for a required clamp force of approximately 85° at 65 lbs/foot of torque. FIG. 5 illustrates a breakaway torque of approximately 60–65 lbs/foot as specified, however, the angle from elastic origin is only about 25°. Based on this measurement, the operator would know that the bolted joint was not developing adequate clamp forces. In application, the most likely cause for the decreased clamp force would be excess friction. The operator could then remove the fastener to properly lubricate the under head and/or insure that the fastener was not cross threaded or if necessary replace the fastener.

Figure 6:
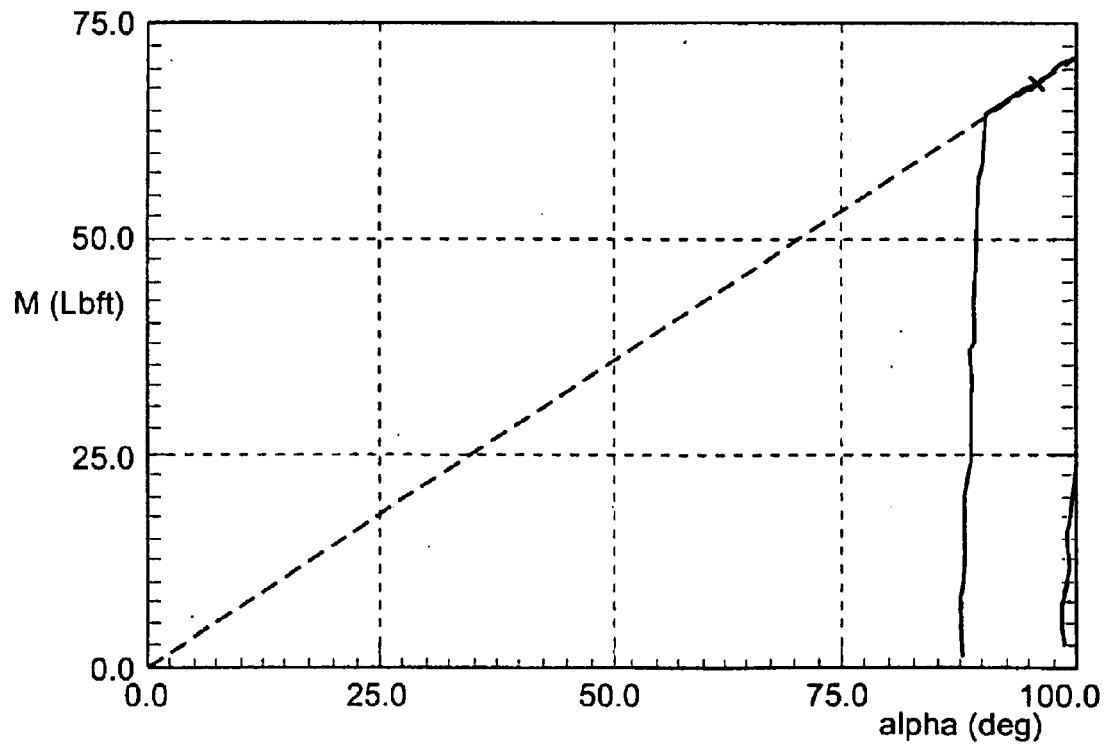
FIG. 6 is a graph depicting a second torque audit.

Using the M-alpha angle as a comparative measure also allows engineers to more accurately audit a group of similarly installed fasteners. One type of audit that can be preformed is a breakaway torque audit. In the example provided in FIG. 6, a fastener was torqued in a tightening direction until an additional turn of about 12° to 13° was achieved. In this example, the head of the fastener started to move at about 55 lbs/foot of torque. The actual breakaway in continuation of the tightening process occurred at about 60 to 65 lbs/foot of applied torque. The angle torque signature curve as shown in FIG. 6 including the calculation of the elastic origin an M-alpha value illustrates an M-alpha angle of approximately 85°. The 85° M-alpha value of FIG. 6 can be compared against another similarly situated fasteners.

Figure 7:
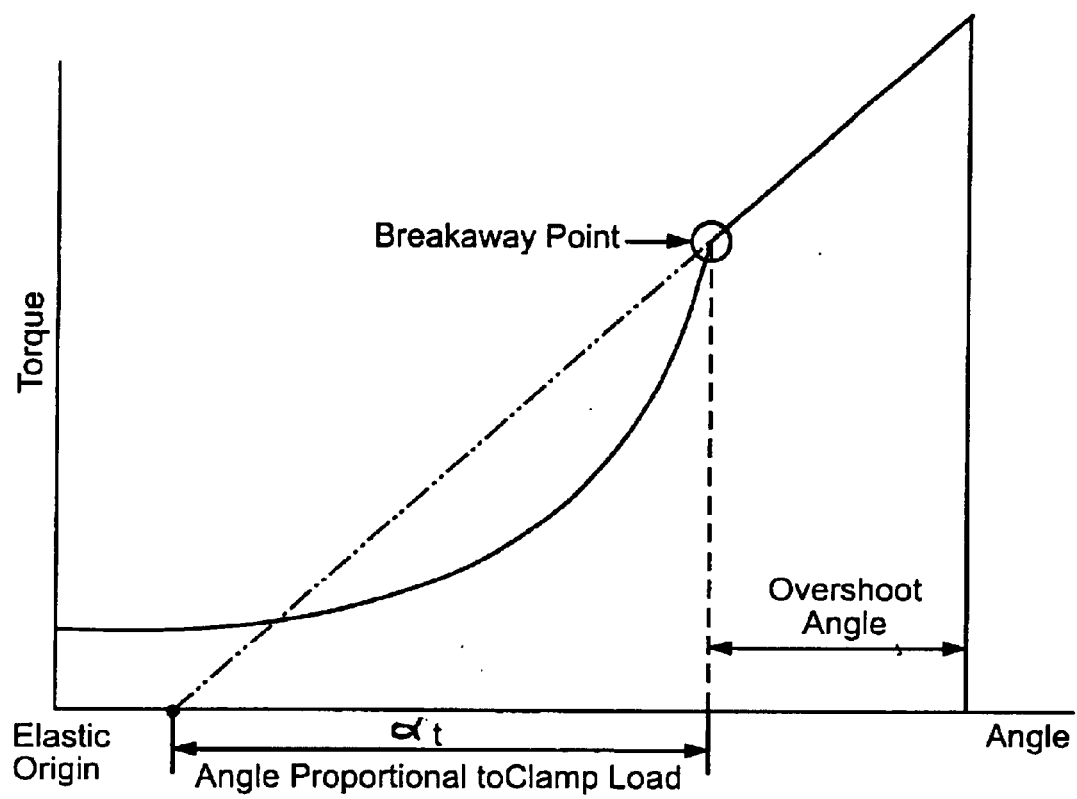
FIG. 7 is a graph depicting a third torque audit.

Referring again to FIG. 5, there is shown a breakaway audit for another similarly installed fastener. Presuming that this fastener was also installed with 60 lbs/foot of torque, one might assume that the preload is the same. However, the breakaway torque audit, as shown in FIG. 5, shows an M-alpha value of 25°. It can thus be seen that the second installed fastener is not developing a satisfactory amount of preload tension compared to the first fastener. Because the primary factors contributing to a loss of preload relate to friction in the under head and thread areas, an engineer could remove this threaded fastener and insure that it was properly lubricated as well as properly threaded. The fastener could be reinstalled and re-audited to insure a satisfactory installed load. When auditing is done in the tightening direction, the tightening process is continued after the breakaway point. This procedure makes practical use of the natural overshoot of the break point. An example is shown in FIG. 7.

A release audit may also be performed. The release signature is created by loosening the bolted joints. Release angle plots can also be used to directly estimate both tension or preload which is the ultimate goal of the fastener tightening process.

Bolted joints which have poorly lubricated under head thread areas may exhibit unique torque angle signature characteristics. Torque angle audit signatures can be evaluated for estimating a clamp force by locating the elastic origin through projection of the tangent line of curve after the breakaway point.

The present invention provides an apparatus and method that can be easily used in the field to accurately estimate the amount of clamp force developed by a threaded fastener. It is understood that the present invention is not limited to the preferred embodiment shown, but rather modifications may be made keeping within the spirit of the invention.

What is claimed is:

1. A method for comparing relative clamp loads between a plurality of previously installed threaded fasteners comprising:

providing a plurality of previously tightened threaded fasteners;

applying an additional torque in a tightening direction a first of the tightened threaded fasteners until a break away torque is reached;

measuring the torque values applied to the first previously tightened fastener and measuring the angle through which the first fastener rotates;

defining a first zero-angle point to be a point at which a tangent from a torque versus angle plot, created from the measured torque and angle values from the first previously tightened fastener, crosses an angle axis;

defining a first audit angle to be the angle between the first zero-angle point and the angle associated break away torque for the first previously tightened fastener;

applying an additional torque in a tightening direction a second of the previously tightened threaded fasteners until a break away torque is reached;

measuring the torque values applied to the second previously tightened fastener and measuring the angle through which the second fastener rotates;

defining a second zero angle point to be a point at which a tangent from a torque versus angle plot, created from the measured torque and angle values from the second previously tightened fastener, crosses an angle axis;

defining a second audit angle to be the angle between the second zero angle point and the angle associated break away torque for the second previously tightened threaded fastener; and comparing the first and second audit angles to determine relative clamp loads.

2. A method as in claim 1 wherein the torque is applied until an angle of rotation between 1 and 15 degrees is achieved.

3. A method as in claim 1 wherein audit angles are defined for the remainder of the plurality of tightened threaded fastener and the plurality of audit angles are compared.

4. A method as in claim 1 wherein the first and second audit angles are compared to a predetermined audit angle.

5. A method for comparing relative clamp loads between a plurality of previously installed threaded fasteners comprising:

providing a plurality of previously tightened threaded releasing fasteners;

applying an additional torque in a releasing direction a first of the previously tightened threaded fasteners until a break away torque is reached;

measuring the torque values applied to the first previously tightened fastener and measuring the angle through which the first fastener rotates;

defining a first zero-angle point to be a point at which a tangent from a torque versus angle plot, created from the measured torque and angle values from the first previously tightened fastener, crooses an angle axis;

defining a first audit angle to be the angle between the first zero-angle point and the angle associated break away torque for the first previously tightened threaded fastener, applying a torque in a releasing direction a second of the previously tightened threaded fasteners until a break away torque is reached;

measuring the torque values applied to the second previously tightened fastener and measuring the angle through which the second fastener rotates;

defining a second zero angle point to be a point at which a tangent from a torque versus angle plot, crested from the measured torque and angle values from the second previously tightened fastener, crosses an angle axis;

defining a second audit angle to be the angle between the second zero angle point and the angle associated break away torque for the second previously tightened threaded fastener; and comparing the first and second audit angles to determine relative clamp loads.

6. A method as in claim 1 wherein the torque is applied until an angle of rotation between 1 and 15 degrees is achieved.

7. A method as in claim 1 wherein audit angles are defined for the remainder of the plurality of previously tightened threaded fasteners and the plurality of audit angles are compared.

8. A method as in claim 1 wherein the first and second audit angles are compared to a predetermined audit angle.

* * * * *